Patented Oct. 16, 1945

2,387,111

UNITED STATES PATENT OFFICE 2,387,111

POLYVINYL CHLORIDE COMPOSITION

Franklin A. Bent, Berkeley, Calif., assignor to Shell Development Company, San Francisco, Calif., a corporation of Delaware No Drawing. Application March 8, 1943, Serial No. 478,445

4 Claims. (Cl. 260—36)

This invention relates to the use of dicyclopentyl adipate as a plasticizer for vinyl resins.

The resistance of polyvinyl chloride to oxidation, organic solvents, acids and alkalis makes it desirable for use in molding, coating and impregnating compositions. Its inherent insolubility and brittleness, however, have made it difficult to find satisfactory plasticizers for polyvinyl chloride. With few exceptions, substances which act as plasticizers for other resins and cellulose derivatives are either incompatible with polyvinyl chloride or, in the amounts necessary to impart the required flexibility, impair its tensile strength. Some substances which are otherwise satisfactory increase the tendency of the resin to discolor under the influence of light and heat. Others may act as excellent plasticizers at room temperature but fail at temperatures in the neighborhood of 0° F. and below.

It is an object of the present invention to provide a new plasticizer for vinyl resins. A further object is to provide polyvinyl chloride compositions exhibiting high tensile strength, flexibility and resistance to impact at low temperatures. Other objects will be apparent from the description given hereinafter.

These objects are accomplished in accordance with the present invention by the use of dicyclopentyl adipate as a plasticizer for vinyl resins, particularly for polyvinyl chloride. It has been found that dicyclopentyl adipate may be incorporated with polyvinyl chloride to form compositions which retain a high degree of plasticity at temperatures below 0° F. The compositions are homogeneous, free from exudation and resistant to light, heat and weathering.

The following examples will serve to illustrate the invention:

Example I 67 parts of polyvinyl chloride and 33 parts of dicyclopentyl adipate were blended by milling for 15 minutes on rollers heated to 100° C. The resulting sheet was perfectly homogeneous, substantially colorless, of high tensile strength and excellent flexibility. A strip of the material 8 inches long, 2½ inches wide and 0.3 inch thick was subjected to a "chill test" in which the strip was bent double and held at 0° F. for 4 hours, following which the folded edge was placed on a flat wooden block and struck with a 1½ pound hammer. Examination failed to reveal cracks or fractures in the strip. Substantially no discoloration was apparent at the end of 1 year.

Example II 90 parts of polyvinyl chloride and 10 parts of dicyclopentyl adipate were blended in a screw-type mixing machine. A sheet formed by subjecting a portion of the composition to pressure between heated polished metal platens was clear and substantially water-white. A strip cut from the sheet was subjected to a "chill test" as described in Example I. No cracks or fractures were observed.

Example III 55 parts of polyvinyl chloride, 10 parts of carbon black and 35 parts of dicyclopentyl adipate were mixed to form a homogeneous mass which was adhered to woven cotton fabric by calendering between rolls heated at 100° C. No tackiness was observed at room temperature. The material displayed excellent flexibility, high tensile strength and abrasion resistance at sub-zero temperatures.

Example IV

A homogeneous blend of 70 parts of polyvinyl chloride and 30 parts of dicyclopentyl adipate was extruded from a screw stuffer as a coating on an electrical conductor. It displayed the ability to withstand severe flexing at sub-zero temperatures.

Example V

Polyvinyl chloride granules plasticized with 50 parts of dicyclopentyl adipate per 100 parts of polyvinyl chloride were formed by compression molding into a bar 6 inches long, 0.5 inch wide and 0.25 inch thick. After having been maintained at 0° F. for 4 hours the bar was bent double and the folded edge was struck with a hammer. No cracking was apparent.

Example VI

A film was formed by casting a solution of 40 parts of polyvinyl chloride, 20 parts of dicyclopentyl adipate and 40 parts of mesityl oxide upon a glass plate, followed by the evaporation of the solvent and the stripping of the film. The film was flexible, perfectly clear and substantially colorless. It was found to possess high tensile strength and impact resistance even at low temperatures.

The compositions of the present invention comprise homogeneous mixtures of polyvinyl chloride and dicyclopentyl adipate. The utility of the invention is most apparent with the more difficultly plasticized, acetone-insoluble polyvinyl chlorides of high molecular weight. If desired, small amounts of other resins may be added.

While the invention has been described as relating principally to polyvinyl chloride, dicyclopentyl adipate acts as a plasticizer for other polyvinyl halides and, as well, for vinyl resins other than the halides. Important compositions comprise polyvinyl acetals containing dicyclopentyl adipate as a plasticizer. Among the polyvinyl acetals, those containing a predominant proportion of butyraldehyde butyral groups are of special interest.

The plasticizer may be incorporated with the resin by mixing with the monomer prior to polymerization or condensation, or it may be conveniently added to the polymer by grinding, mixing or milling, or by the use of hot rolls such as are employed in the rubber industry. Solvents may be used to facilitate blending, particularly where the preparation of coating compositions is involved. There may be added titanium dioxide, carbon black, zinc oxide, barytes, clay, wood flour and other common pigments and fillers as well as dyes and other modifiers.

The amount of plasticizer used will depend upon the purpose of the composition. Molded articles ordinarily require less plasticizer than coatings on flexible backings such as fabrics. Amounts of dicyclopentyl adipate as small as 5% by weight of the total composition impart noticeable plasticity thereto. On the other hand, complete compatibility and freedom from exudation characterize compositions in which the plasticizer is present in an amount as great as 75% by weight of the total. For most purposes, however, the plasticizer will vary from about 20% to about 50% by weight of the total.

Dicyclopentyl adipate may be used alone or in conjunction with small amounts of other plasticizers. It has been found that in the presence of dicyclopentyl adipate somewhat larger amounts of other substances than are alone compatible with vinyl resins blend completely homogeneously therewith, forming clear compositions of satisfactory strength and flexibility.

Dicyclopentyl adipate shows little tendency to evaporate from the prepared vinyl compositions containing it, even over long periods of time. The loss due to volatility in blending on heated equipment is small.

The compositions of the present invention find use in a variety of applications. In granular and pellet form they serve for compression and injection in molding, and for continuous extrusion. Their high dielectric strength makes them valuable for insulation for electric conductors, for transformer coils and as battery grids. The polyvinyl chloride compositions of the invention form coatings highly resistant to acids, alkalis and organic solvents and are particularly valuable where this property of chemical resistance must be combined with high tensile strength, flexibility and abrasion resistance at sub-zero temperatures. The polyvinyl acetal compositions of the invention may be used as safety glass interlayers.

I claim as my invention:

1. A composition comprising a polyvinyl chloride resin and dicyclopentyl adipate.

2. A resinous composition comprising 100 parts of polyvinyl chloride and from about 5 parts to about 75 parts of dicyclopentyl adipate.

3. A composition comprising a vinyl halide resin plasticized with dicyclopentyl adipate.

4. A composition comprising 100 parts of a polyvinyl halide and from about 5 parts to about 75 parts of dicyclopentyl adipate.

FRANKLIN A. BENT.